Feb. 2, 1954  J. N. CUSSOTTI  2,667,858
POULTRY FEEDER
Filed April 17, 1950  2 Sheets-Sheet 1

Joseph N. Cussotti
INVENTOR.

BY *Clarence A. O'Brien*
*and Harvey B. Jacobson*
Attorneys

Feb. 2, 1954 J. N. CUSSOTTI 2,667,858
POULTRY FEEDER
Filed April 17, 1950 2 Sheets-Sheet 2

Joseph N. Cussotti
INVENTOR.

BY Clarence A. O'Brien
and Harvey B. Jacobson
Attorneys

Patented Feb. 2, 1954

2,667,858

UNITED STATES PATENT OFFICE 2,667,858

POULTRY FEEDER

Joseph N. Cussotti, Farmingdale, N. J., assignor of fifty per cent to Vittorio Cussotti, Farmingdale, N. J.

Application April 17, 1950, Serial No. 156,388

4 Claims. (Cl. 119—52)

This invention comprises novel and useful improvements in a poultry feeder, and more specifically pertains to an improved poultry feeding device.

The primary object of this invention is to provide a poultry feeder which shall have an improved, simple, economical and light-weight construction; shall consist of a plurality of readily removable assemblies to facilitate cleaning, servicing of the same, and which shall have various usages by poultrymen.

Yet another important object of the invention is to provide an improved poultry feeder in conformity with the foregoing objects which shall have a greatly improved and highly efficient action in dispensing poultry feed from a hopper to a feed trough; which will permit ready visual inspection of the hopper to ascertain the presence of a sufficient quantity of feed therein without the necessity for dismantling the same; and which shall be so constructed as to facilitate the proper dispensing of feed and preventing clogging of the feeding construction of the hopper in an improved manner.

Yet another important object of the invention is to provide an improved feed hopper in conformity with the foregoing objects, which shall have a protective hood assembly capable of selective positioning and closing access to the feed in the feed trough and for affording access thereto; together with an improved cooperating structure to greatly enhance the supporting of the hood in its alternative positions.

An additional object of the invention is to provide an improved poultry feeder as set forth in the preceding objects which shall have a readily replaceable and improved construction of cover and fastening means for the same and shall permit access to the interior of the hopper without disturbing other elements of the poultry feeder.

And a final important feature and object of the invention to be specifically enumerated herein is to provide a poultry feeder having feed trough, hopper, hood and cover assemblies, together with improved supporting means for assembling these elements in an operative position; and wherein supporting means shall include rotatable, locking or fastening means for retaining the elements in assembled position.

These, together with various ancillary features and objects of the invention, which will later become apparent as the following description proceeds, are attained by the present invention, a preferred embodiment of which has been illustrated, purely as an exemplification of the principles of the invention and not as a limitation of the same, wherein.

Figure 1:
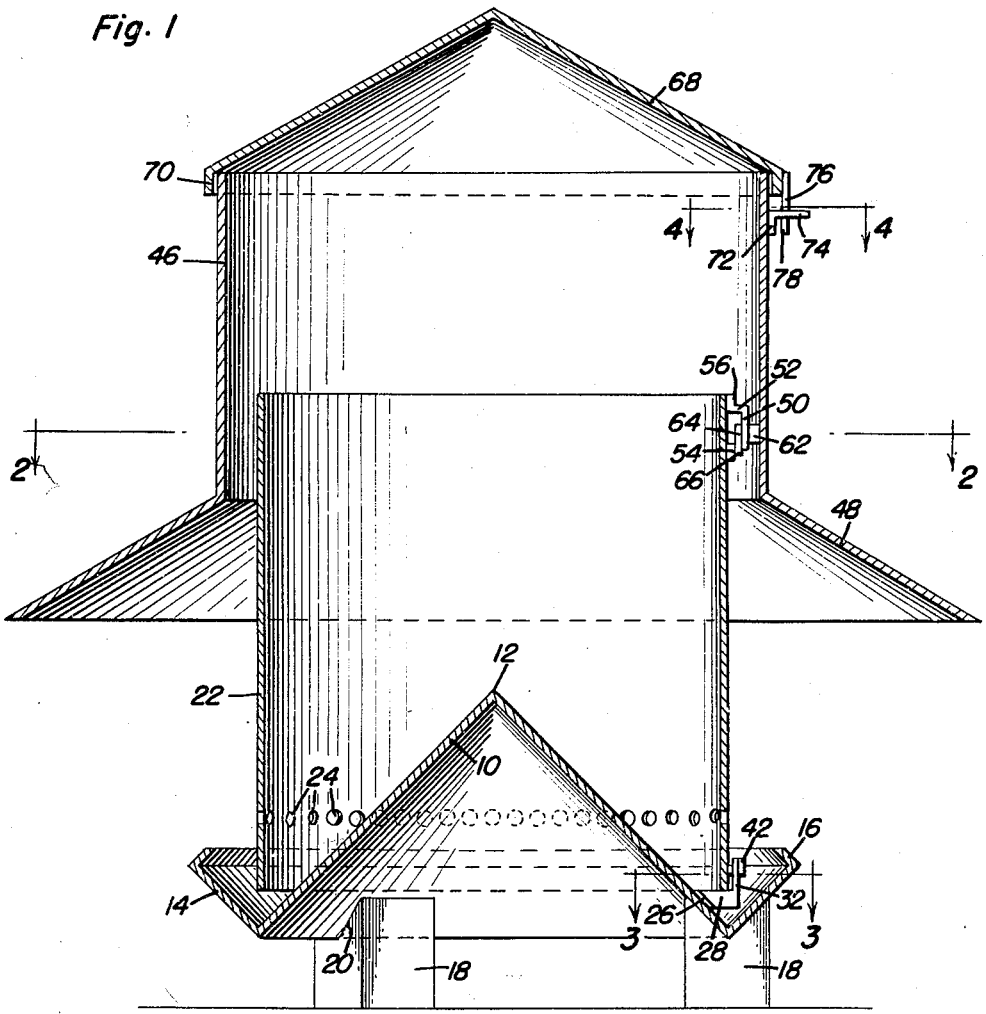
Figure 1 is a vertical central sectional view through a preferred embodiment of the improved feed hopper embodying the principles of this invention, the hood assembly of the same being illustrated in its raised position to afford access to the feed trough of the device, taken substantially upon the plane indicated by the section line 1—1 of Figure 2.

Referring now more specifically to the accompanying drawings, wherein like numerals designate similar parts throughout the various views, attention is directed first to Figure 1 wherein it will be seen that the improved poultry feeder includes a plurality of separate assemblies which are detachably connected together to form the entire device. These assemblies include a feed trough assembly, a hopper assembly detachably mounted thereon and secured thereto, a hood assembly adjustably carried by the hopper assembly, and a cover assembly removably secured to the hood assembly.

The feed trough assembly comprises an annular feed trough having an inner wall 10 constituting a right cone with an apex 12, the lower edge of this cone being united with a frusto-conical member 14 which extends upwardly and outwardly from the base of the cone 10. The conical members 10 and 14 thus constitute upwardly and outwardly inclined side walls which define therebetween an annular, V-shaped trough constituting a feed trough. At its upper edge, the outer wall 14 is provided with a frusto-conical upwardly and inwardly extending lip 16, the same overlying the interior of the feed trough. It will now be apparent that any suitable poultry feed placed within the trough defined by the inner and outer side walls will descend by gravity to the bottom or interior of the trough, and will be readily accessible for poultry. Wasting of this feed is prevented by the inturned lip 16 which causes feed thrown upwardly by the bills of the poultry to fall back into the interior of the trough and be available for use.

As described, the feed trough assembly could rest directly upon the ground or any other supporting surface. However, it is preferred to provide the same with supporting legs, in any suitable number, such as three, these legs conveniently comprising vertical pillars or blocks 18, whose upper edges are provided with V-shaped notches having inclined side walls 20, suitably contoured to conform to and receive the outer surfaces of the inner and outer side walls 10 and 14. It is to be understood that the legs 18 will be secured to the feed trough assembly in any desired manner, the same forming no part of the present invention.

Detachably mounted in and supported by the feed trough assembly in a manner to be more specifically set forth hereinafter is a hopper assembly, the same conveniently comprising a cylinder 22, preferably a right cylinder, the same having open upper and lower ends, the lower portion of the cylinder being provided with a plurality of circumferentially spaced apertures 24 disposed in a ring around the cylinder in substantially the same horizontal plane. These apertures are preferably of a size which is sufficiently restricted to prevent the passage of feed through the same, but are disposed slightly above the lip 16 when the hopper is mounted in the feed trough assembly, so that visual inspection may be made by these apertures to determine the presence of sufficient feed in the hopper. Moreover, these apertures serve a further vital function in that if moist feed were present in the hopper and would tend to clog between the wall of the hopper 22 and the inclined inner wall 10, the same would be visible through the apertures 24 so that poultry feeding from the hopper would be attracted to the same and would peck feed through the apertures 24, thereby loosening the congestion or accumulation of feed and causing the same to feed downwardly upon the inclined inner wall to the bottom of the feed trough.

Figure 6:
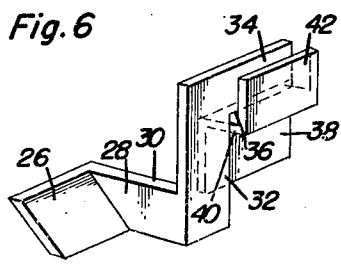
Figure 6 is a perspective view of the supporting and fastening brackets of Figure 3, for supporting the cylindrical hopper in the feed trough and for locking the same to the latter.
Figure 3:
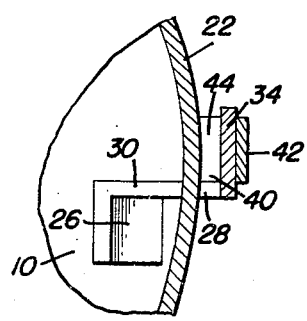
Figure 3 is an enlarged horizontal sectional detail view taken substantially upon the plane indicated by the section line 3—3 of Figure 1 and illustrating in particular the supporting bracket and its association with the feed trough and of the cylindrical hopper mounted in the same.

Attention is now directed more specifically to Figures 1, 3 and 6 for an understanding of the construction and arrangement of the means for supporting and securing the hopper assembly upon the feed trough assembly. This means comprises two sets of cooperating bracket members, each set comprising any desired number, preferably three identical brackets. The set of bracket members secured to the feed trough assembly consists of flat end portions 26 which are adapted to rest upon and be secured to the inner surface of the inner side wall 10 in any suitable or desired manner, such as by rivets, by spotwelding, or the like, the inclined portions 26 being angularly disposed upon horizontal portions 28. The horizontal portions extend laterally from the inner side wall 10 toward the outer side wall 14 and are provided with horizontally disposed surfaces 30 upon which the lower edge of the cylinder or hopper 22 is adapted to rest, as clearly shown in Figure 3.

At their opposite extremities from the inclined portions 26, the lateral portions 28 are provided with vertically extending portions 32 which are disposed on the exterior of the cylinder 22 as will be seen from Figures 1 and 3. Disposed horizontally and upon the upper ends of the vertical portions 32 are laterally extending portions 34, the same having horizontal surfaces 36 on their lower sides. The set of bracket members carried by the cylinder 22, likewise preferably three in number but in any event of the same number as the bracket members carried by the feed trough assembly, comprise angle brackets having vertical portions 38 which are fixedly secured to the lower portion of the cylinder 22, as by spotwelding, riveting, or the like, and are flush with the lower edge thereof, the vertical portions 38 having outwardly and horizontally disposed portions 40 which, at their outer ends, are provided with vertical portions 42 disposed in parallel relation to the portions 38. The upper surfaces 44 (see Figure 3) of the horizontal portions 40, and the lower horizontal surfaces 36 of the horizontal portions 34 may either or both be relatively slightly inclined to constitute camming surfaces, for a purpose to be now described.

As will be seen from Figures 3 and 6, the vertical portions 42 lie outwardly of the portions 34, and the arrangement is such that the cylinder 22 may be inserted in the feed trough with the set of brackets carried by the cylinder being disposed between the set of brackets carried by the feed trough assembly. At this time the lower edge of the cylinder 22 will rest upon the horizontal support surfaces 30 of the brackets carried by the feed trough assembly, and upon rotation of the cylinder relative to the feed trough, the horizontal camming surfaces 44 of the cylinder brackets would slide under the horizontal camming surfaces 36 of the feed trough brackets and a camming action will occur during this rotation which will draw the hopper and feed trough assemblies into tight fitting engagement. This rotational movement will of course be completed by engagement of the adjacent side surfaces of the horizontal portion 40 with the vertical surface of the vertical portion 32. When so engaged, it will now be readily seen that by lifting the hopper assembly, the united hopper and feed trough assemblies may be readily transported or moved.

Vertically slidably mounted upon the hopper 22 is a hood assembly. The latter includes a sleeve 46 constituting a right cylinder which is of a greater diameter than the cylinder 22 and which surrounds and is spaced from the latter. At its lower end, the sleeve 46 is provided with a conical outwardly flaring skirt 48 whose lower edge considerably overlies and overhangs the side wall 14 and lip 16 of the feed trough assembly. The arrangement is such that when the hood assembly is in its lowered position, the skirt 48 will rest upon the lip 16 and completely overlie the same, thereby preventing access to the contents of the feed trough. In its raised position, the hood assembly will shelter the feed trough against rain or the like while affording sufficient access to the contents of the feed trough to permit effective feeding of poultry but preventing fouling of the contents of the feed trough by poultry.

Figure 2:
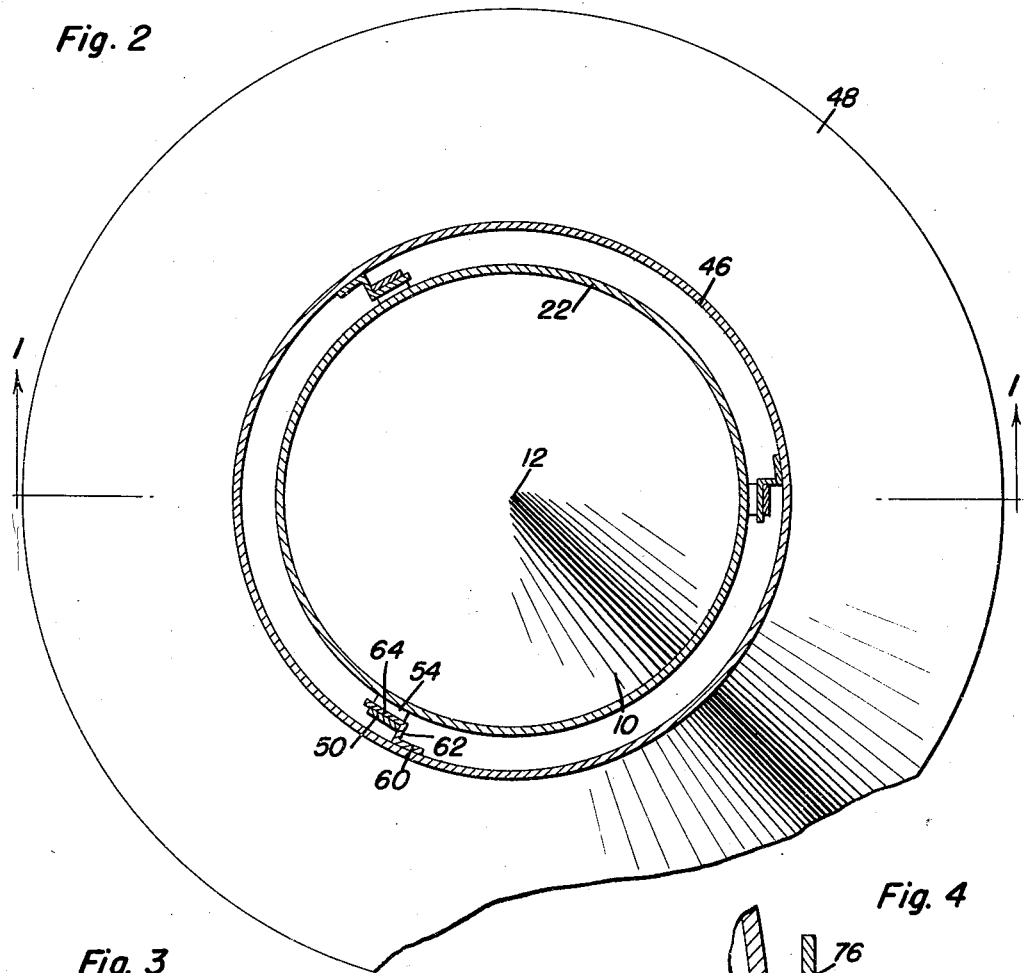
Figure 2 is a horizontal sectional view, taken substantially upon the plane indicated by the section line 2—2 of Figure 1.

Means are provided for locking or retaining the hood in its raised position upon the hopper assembly, in the position indicated in Figure 1. This means preferably takes the form of co-operating sets of brackets, one set being carried by the hopper assembly and the other set being carried by the sleeve 46. The construction and operation of the supporting and locking means will be better understood by reference to Figures 1 and 2, and particularly Figure 7.

Any desired number of brackets are provided for each of the two sets. Conveniently, three brackets may be provided in each set, and the brackets of the hopper assembly consist of U-shaped brackets having vertical web portions 50 with horizontally disposed upper and lower legs 52 and 54, the free edges of these legs being provided with vertical flanges 56 and 58 by means of which these brackets are secured in any desired manner as by welding, riveting, or the like, to the exterior surface of the cylinder 22 at the upper end thereof. In this arrangement, the web portions 50 are disposed in parallel relation to the exterior surface of the cylinder 22 and in spaced relation thereto. It is obvious that any desired shape can be given to the web portions 50. The brackets carried by the hood assembly comprises base portions 60 adapted to be secured in any desired fashion to the interior surface of the sleeve 46 slightly above the lower end of the same, inwardly extending horizontal projections 62 being carried by the portions 60 and in turn carrying laterally extending portions 64. The portions 64 are thus disposed adjacent to but in spaced relation to the cylindrical interior wall of the sleeve 46. If desired, the portions 64 could be either straight or curved in conformity with the cylindrical curvature of the sleeve 46.

Figure 7:
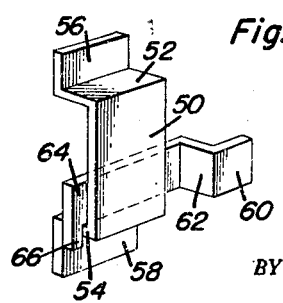
Figure 7 is a perspective view of the supporting and fastening brackets for securing the hood assembly to the cylindrical hopper assembly of the device.

The portion 64 is adapted to be received between the web portion 50 and the exterior surface of the cylinder 22, and is adapted to rest upon and be supported by the horizontal member 54 of the cylinder bracket. In order to retain these cooperating brackets in their engaged relation, it is preferred to form the under surface of the portion 64 with a vertical recess or depression; or, in lieu thereof, to provide a depending lug or projection 66, see Figure 7, which is adapted to overlie and laterally abut the vertical side of the horizontal portion 54 as shown in Figure 7.

It will now be seen that with the brackets of the hood being disposed between the brackets of the cylinder, the hood may be raised, lowered or removed as desired. In order to engage and lock the brackets of the two assemblies, the brackets are disposed in substantially the same horizontal plane, whereupon the hood is rotated relative to the cylinder to cause the portion 64 to enter the space between the webs 50 and the cylinder 22, until the portion 62 abuts against one edge of the web 50. At this time, the hood is then lowered until the under surface of the portion 64 rests upon the upper surface of the horizontal portion 54, with the recess or with the lug 66 engaging the vertical side wall or side walls of the horizontal portion 54, thereby preventing withdrawal of the engaged brackets.

Figure 5:
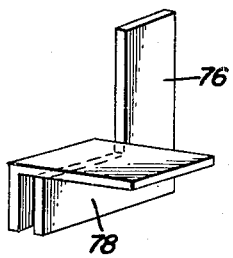
Figure 5 is a perspective detail view of the fastening or locking brackets of Figure 4 for securing the hood assembly to the cover assembly.
Figure 4:
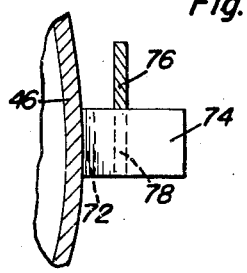
Figure 4 is an enlarged horizontal sectional detail view taken substantially upon the plane indicated by the section line 4—4 of Figure 1, and illustrating in particular the cam locking or fastening means for securing the cover assembly to the hood assembly of the device.

The sleeve 46 is likewise open at its upper end, and a removable cover assembly is provided therefor. Conveniently, this cover assembly may comprise a conical member 68 whose lower edge somewhat overlies the upper edge of the sleeve 46, and is provided with a cylindrical depending rim 70 embracing loosely the upper portion of the sleeve 46. In order to retain the cover assembly upon the hood assembly, a fastening means is provided consisting of sets of cooperating brackets respectively carried by the sleeve 46 and the cover rim 70. As shown in Figures 1, 4 and 5, the bracket assembly of the sleeve 46 consists of a pair of oppositely disposed angle brackets having vertical portions 72 suitably attached to the sleeve 46 adjacent from but spaced below its upper edge, and having horizontally disposed legs 74. The legs 74 extend sufficiently beyond the sleeve 46 and on opposite sides of the same to constitute handles or finger grip members whereby the hood assembly, the hopper assembly and/or the feed trough assembly may be lifted and transported. Fixedly secured to and depending from the cover rim 70 are a pair of brackets, each comprising a vertical leg 76 having at its lower extremity a horizontally extending leg 78. The upper surface of the horizontal leg 78, and the under surface of the horizontal member 74 may either or both be provided with cooperating cam surfaces so that upon relative rotation of these members a camming action will occur for securely locking the cover assembly to the hood assembly or releasing the same upon relative rotation of those members.

From the foregoing, it is believed that the construction and operation of the device will now be readily understood and further explanation is believed to be unnecessary. However, it will be apparent that the entire device is readily adapted for easy and economical fabrication from various suitable materials, particularly such as light weight sheet metal, suitable plastics or the like. Moreover, the various elements can be made in any desired size as expediency shall dictate. Further, although the various assemblies have been illustrated and described as being subsstantially circular and as being substantially coaxial, it is to be understood that other shapes and sizes may be employed as desired, although the circular or cylindrical arrangement and the coaxial disposition of the subassemblies have been found to be particularly advantageous and satisfactory both from the manufacturing and utilitarian standpoint. As will be further apparent, the entire device may be locked in the assembled position shown in Figure 1, and may be readily transported or moved by the handles 74.

It will further be understood that although the various supporting brackets have been disclosed as consisting of flat, plate-like members, the same may be curved in conformity with the common vertical axis of all of the members; or may be made in other shapes as desired.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. A poultry feeder comprising an annular trough having a side wall and a bottom, a cylindrical hopper, means supporting said hopper with its lower end within said trough and in spaced relation to the bottom thereof, a hood surrounding said hopper, means selectively positioning said hood in a lowered position to rest upon said side wall and close said trough and in a raised position to clear said side wall and afford access to said trough, said hood including a sleeve having an upper portion and end and being open at its upper end, brackets on the upper portion of said sleeve, a cover on the open end of said sleeve, brackets depending from said cover, cooperating horizontal cam surfaces on said brackets for securing said cover to said sleeve upon relative rotation thereof, said sleeve brackets constituting handles for lifting said device.

2. A poultry feeder comprising an annular trough, said trough having conical, upwardly diverging inner and outer side walls, a cylindrical hopper having open upper and lower ends, means supporting said hopper vertically in said trough, said trough having a bottom, the lower end of said hopper being disposed in spaced relation to the bottom and the upper edge of said trough, said support means including brackets having inclined portions secured to one of said side walls, horizontal portions extending from said inclined portions into said trough and supporting the lower end of said hopper, and locking means securing said hopper to said support means, said locking means including vertical extensions on said horizontal portions remote from said inclined portions and having upper end, horizontal cam surfaces on the upper ends of said vertical extensions and on said hopper, the cam surfaces on said hopper being rotatable to underlie those of the support means.

3. A poultry feeder comprising an annular trough having a side wall and a bottom, a cylindrical hopper having a lower end and an upper portion, means supporting said hopper with its lower end within said trough and in spaced relation to the bottom thereof, a hood surrounding said hopper, means on said hopper and said trough selectively positioning said hood in a lowered position to rest upon said side wall and close said trough and in a raised position to clear said side wall and afford access to said trough, said hood including a cylindrical sleeve surrounding said hopper in spaced relation thereto, a conical skirt depending from said sleeve and overhanging said side wall, said last-mentioned means including cooperating brackets secured to the upper portion of said hopper and the lower portion of said sleeve, said brackets having complementary horizontal surfaces engageable upon relative rotation thereof.

4. A poultry feeder comprising an annular trough having a side wall and a bottom, a cylindrical hopper having a lower end and an upper portion supporting said hopper with its lower end within said trough and in spaced relation to the bottom thereof, a hood surrounding said hopper, means on said hopper and said trough selectively positioning said hood in a lowered position to rest upon said side wall and close said trough and in a raised position to clear said side wall and afford access to said trough, said hood including a cylindrical sleeve surrounding said hopper in spaced relation thereto, said cylindrical sleeve having a lower portion and lower end, a conical skirt depending from the lower end of said sleeve and overhanging said side wall, said last-mentioned means including cooperating brackets on the upper portion of said hopper and the lower portion of said sleeve, said brackets having complementary horizontal surfaces engageable upon relative rotation thereof, the horizontal surface of said sleeve bracket having a vertical notch in its surface for overlying and receiving the horizontal surface of the hopper bracket.

JOSEPH N. CUSSOTTI.

References Cited in the file of this patent

UNITED STATES PATENTS

| Number | Name | Date |
|---|---|---|
| 948,839 | Barnhart | Feb. 8, 1910 |
| 1,020,505 | Huff | Mar. 19, 1912 |
| 1,026,859 | Garrison | May 21, 1912 |
| 1,078,853 | Heath | Nov. 18, 1913 |
| 1,112,971 | Bower | Oct. 6, 1914 |
| 1,114,482 | Johnson | Oct. 20, 1914 |
| 1,141,059 | Hershey | May 25, 1915 |
| 1,159,190 | Derr | Nov. 2, 1915 |
| 1,413,750 | McCollough | Apr. 25, 1922 |
| 1,520,607 | Smith | Dec. 23, 1924 |
| 1,601,030 | Love | Sept. 28, 1926 |
| 1,614,394 | Robison | Jan. 11, 1927 |
| 1,623,840 | Kassy | Apr. 5, 1927 |
| 1,666,322 | West | Apr. 17, 1928 |
| 1,699,501 | McCartney | Jan. 15, 1929 |
| 1,769,042 | Short | July 1, 1930 |
| 1,779,016 | Scholle | Oct. 21, 1930 |
| 2,222,369 | McLeod | Nov. 19, 1940 |
| 2,366,584 | Woodward | Jan. 2, 1945 |

FOREIGN PATENTS

| Number | Country | Date |
|---|---|---|
| 3,639 | Great Britain | July 14, 1910 |
| 22,392 | Great Britain | 1914 |
| 564,262 | Germany | Nov. 17, 1932 |
| 417,275 | Great Britain | Oct. 2, 1934 |
| 428,951 | Great Britain | May 22, 1935 |